(12) United States Patent
Tanimoto

(10) Patent No.: US 6,958,586 B2
(45) Date of Patent: Oct. 25, 2005

(54) VECTOR CONTROL INVERTOR

(75) Inventor: Masanori Tanimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 50 days.

(21) Appl. No.: 10/486,946

(22) PCT Filed: Jul. 12, 2002

(86) PCT No.: PCT/JP02/07108

§ 371 (c)(1),
(2), (4) Date: Feb. 13, 2004

(87) PCT Pub. No.: WO2004/008628

PCT Pub. Date: Jan. 22, 2004

(65) Prior Publication Data

US 2005/0174088 A1  Aug. 11, 2005

(51) Int. Cl.[7] .................................................. H02P 3/18
(52) U.S. Cl. ...................... 318/254; 318/138; 318/432; 318/811; 318/599
(58) Field of Search ................................. 318/138, 254, 318/432, 434, 439, 599, 811, 720, 721

(56) References Cited

U.S. PATENT DOCUMENTS

| | | | | |
|---|---|---|---|---|
| 5,504,404 A | * | 4/1996 | Tamaki et al. ............... | 318/432 |
| 5,677,611 A | * | 10/1997 | Yoshihara et al. ........... | 318/803 |
| 5,920,161 A | * | 7/1999 | Obara et al. ................. | 318/139 |
| 6,166,514 A | * | 12/2000 | Ando et al. .................. | 318/811 |
| 6,344,725 B2 | * | 2/2002 | Kaitani et al. ............... | 318/700 |
| 6,456,909 B1 | * | 9/2002 | Shimada et al. .............. | 701/22 |
| 6,580,247 B2 | * | 6/2003 | Nakazawa .................... | 318/700 |
| 6,683,428 B2 | * | 1/2004 | Pavlov et al. ................ | 318/432 |
| 6,777,897 B2 | * | 8/2004 | Murai ......................... | 318/138 |
| 6,788,024 B2 | * | 9/2004 | Kaneko et al. ............. | 318/807 |
| 6,844,697 B2 | * | 1/2005 | Masaki et al. ............... | 318/721 |

FOREIGN PATENT DOCUMENTS

| JP | 03-235688 A | 10/1991 |
|---|---|---|
| JP | 07-131994 A | 5/1995 |
| JP | 2001-292587 A | 10/2001 |

* cited by examiner

Primary Examiner—Rina Duda
(74) Attorney, Agent, or Firm—Sughrue Mion, PLLC

(57) ABSTRACT

A vector control inverter comprises at least one of a set of a torque estimating unit that estimates an output torque of a motor from excitation current and torque current and a pulse transmitting unit that outputs a torque estimation value estimated by the torque estimating unit as positive-negative identifiable pulse stream signals, and a set of a pulse array input unit that receives pulse stream signals input from outside as positive and negative values and a torque instruction converting unit that converts the received pulse stream signals into a torque instruction to be transferred to the motor as a torque.

9 Claims, 5 Drawing Sheets

VECTOR CONTROL INVERTOR

TECHNICAL FIELD

The present invention relates to a vector control inverter that synchronously drives a plurality of motors.

BACKGROUND ART

FIG. 5 is a block diagram of a conventional vector control apparatus. The vector control apparatus includes a three-phase alternating current source, a rectifying circuit 2 including a diode, etc. for obtaining direct current voltage from the three-phase alternating current source 1, an electrolytic capacitor 3 that smoothens the direct current voltage, an inverter circuit 4 including switching elements such as transistor, etc., an induction electric motor (hereinafter "a motor") 5 to which a load is connected, a speed detector 6 that detects the rotation speed of the motor 5, a current detector 7 that detects the three-phase primary current Iu, Iv, and Iw flowing into the motor 5, a speed command circuit 8 that assigns a speed instruction $\omega^*$ of the motor 5, a three-phase-to-two-phase current converter 9 that calculates an excitation current I1$d$ and a torque current I1$q$ from the three-phase current Iu, Iv, and Iw, a vector control calculating circuit 10 that calculates primary voltage instruction values V1$d^*$ and V1$q^*$ to be assigned to the motor by inputting the speed instruction value $\omega^*$ of the speed instruction circuit 8 and a detection value $\omega$ of the speed detector 6 as well as the two-phase calculation values I1$d$ and I1$q$ of the current detector 7, and a two-phase-to-three-phase voltage converter 11 that calculates three-phase output voltage instruction values Vu*, Vv*, and Vw* from the two-phase primary current instruction values V1$d^*$ and V1$q^*$.

The vector control apparatus further includes an output torque estimator 12 that calculates an output torque of the motor 5 from the calculation values I1$d$ and I1$q$ of the three-phase to two-phase current converter 9, an analog output unit 13 that digital-to-analog converts the output torque estimation value of the output torque estimator 12 and outputs an analog voltage, and an analog input unit 14 that analog-to-digital converts the analog voltage signal and converts the digital analog voltage signal to a torque instruction. In the circuit shown in FIG. 5, although all three, namely, the output torque estimator 12, the analog output unit 13, and the analog input unit 14 are present, if only a master is involved, the output torque estimator 12 and the analog output unit 13 are necessary, and if only a slave is involved, the analog input unit 14 alone is necessary.

Explained next is a control method for the synchronous operation of two vector control inverters that have the structure described above.

In the synchronous operation, given that q axis current I2$q$ is controlled such that it is zero as regards the flux of a secondary side rotor, the following expression (1) is used for calculating the output torque by the output torque estimator 12 based on the calculation result of the three-phase-to-two-phase current converter 9 in the master vector control inverter.

$$Tm = Kt \cdot I1q \cdot I1d \quad (1)$$

where Kt is a torque coefficient corresponding to the motor.

In the analog output circuit 13, the digital value is converted into an analog value such that the calculation result of the output torque estimator 12 is normalized to match the bit count of the analog-to-digital converter in the analog input circuit 14 on the slave side and an analog voltage is output to the slave vector control inverter.

In the slave vector control inverter, the analog voltage that is output from the master vector control inverter is input to the analog input circuit 14 and converted into a torque instruction and the motor 5 is rotated in a torque control mode.

Thus, in the synchronous operation that employs the conventional vector control inverters, the torque is estimated by the master vector control inverter, the estimated digital torque value is once converted to an analog signal and output to the slave vector control inverter. The analog signal received from the master vector control inverter is converted into a digital torque value by the slave vector control inverter and the motor 5 on the slave side is rotated in the torque control mode. The transfer for synchronization signals involves conversion of a digital value to an analog signal (a process that takes place in the master vector control inverter) and conversion of the analog signal back to the digital value (a process that takes place in the slave vector control inverter). Therefore, any offset in the analog signal or a fluctuation in the level of the analog signal affects functioning of both the master side and the slave side (for instance, discord or fluctuation, etc. of the slave side with regard to the master side). Besides, since an analog signal is used between the master side and the slave side, the noise factor also casts a considerable effect on the functioning of the master side and the slave side.

As an alternative method, data is transferred as a digital signal by employing a serial communication network between the master and the slave. In this case, for the synchronous operation, it is necessary to transmit the torque signal of the master vector control inverter in realtime to the slave vector control inverter. In the case where plural slave vector control inverters are used, the torque signal of the master vector control inverter is required to be transmitted to all the slave control inverters simultaneously.

Consequently, carrying out the synchronous operation in a serial communication network necessitates a complex system with requirement of communication control hardware for fast data transmission between the master and the slave, and communication software for receiving signals for obtaining synchronization between the inverters and for the inverters to receive data and carry out processes in accordance with the synchronization signals.

In Japanese Patent Laid Open Publication No. H9-182481, a speed difference control apparatus is disclosed that, using a pulse array control, drives a slave servo motor to rotate at a predetermined speed difference with respect to the rotation speed of a master servo motor. This speed difference control apparatus pulse array controls the rotation speed of the slave servo motor based on the sum or difference of the detected pulse array frequency value of the rotation speed of the master servo motor and the pulse array frequency of the predetermined speed difference. However, in this method, synchronous operation is possible only if the structure comprises a single master servo motor and a single slave servo motor. In a structure that comprises two or more slave servo motors, it is not possible to keep the conditions identical, since the sum or difference are obtained for each slave servo motor with respect to the master servo motor.

In Japanese Patent Laid Open Publication No. H11-41967, a driving apparatus in the form of an operation control apparatus that includes plural rotation-driven wheels is disclosed. This operation control apparatus includes a speed control mode inverter that speed-controls one of the wheels based on the operation speed set by a target speed setting unit and a torque control mode inverter that produces a torque equal to that of the speed control mode inverter and torque-controls the wheels excluding the wheel that is speed-controlled by the speed control mode inverter. However, this conventional technology does not allow removal or addition of a slave axis during the synchronous operation.

Therefore, it is an object of the present invention to obtain a vector control inverter that allows transfer of synchronization signals (digital signals) without the necessity for a conversion process from digital signals to analog signals and vice versa.

It is another object of the present invention to allow synchronous operation in a system comprising a single master vector control inverter and two or more slave vector control inverters, and further allow removal or addition of slave axes during synchronous operation.

DISCLOSURE OF THE INVENTION

It is an object of the present invention to solve at least the problems in the conventional technology.

The vector control inverter according to one aspect of the present invention includes a speed detecting unit that detects a rotation speed of a motor, a current detecting unit that detects a primary current applied to the motor from an inverter circuit, a current converting unit that splits the primary current into an excitation current and a torque current, a calculating unit that calculates an excitation voltage and a torque voltage based on the rotation speed, a voltage converting unit that outputs a three-phase output voltage from the excitation voltage and the torque voltage, a modulating unit that outputs, based on the three-phase output voltage, a signal to control switching devices of the inverter circuit, an estimating unit that estimates an output torque of the motor from the excitation current and the torque current, and a pulse transmitting unit that outputs the output torque as a positive-negative identifiable pulse stream signal.

The vector control inverter according to another aspect of the present invention includes a speed detecting unit that detects a rotation speed of a motor, a current detecting unit that detects a primary current applied to the motor from an inverter circuit, a current converting unit that splits the primary current into an excitation current and a torque current, a calculating unit that calculates an excitation voltage and a torque voltage based on the rotation speed, a voltage converting unit that outputs a three-phase output voltage from the excitation voltage and the torque voltage, a modulating unit that outputs, based on the three-phase output voltage, a signal to control switching devices of the inverter circuit, a pulse stream inputting unit that receives a pulse stream signal from outside, and a torque instruction converting unit that converts the pulse stream signal into a torque instruction.

The vector control inverter according to still another aspect of the present invention includes a speed detecting unit that detects a rotation speed of a motor, a current detecting unit that detects a primary current applied to the motor from an inverter circuit, a current converting unit that splits the primary current into an excitation current and a torque current, a calculating unit that calculates an excitation voltage and a torque voltage based on the rotation speed, a voltage converting unit that outputs a three-phase output voltage from the excitation voltage and the torque voltage, a modulating unit that outputs, based on the three-phase output voltage, a signal to control switching devices of the inverter circuit, an estimating unit that estimates an output torque of the motor from the excitation current and the torque current, a pulse transmitting unit that outputs the output torque as a positive-negative identifiable pulse stream signal, a pulse stream inputting unit that receives a pulse stream signal from outside, and a torque instruction converting unit that converts the pulse stream signal into a torque instruction.

The other objects, features and advantages of the present invention are specifically set forth in or will become apparent from the following detailed descriptions of the invention when read in conjunction with the accompanying drawings.

BEST MODE FOR CARRYING OUT THE INVENTION

Exemplary embodiments of a vector control inverter according to the present invention will be explained with reference to the accompanying drawings. The present invention is not limited to the present embodiment.

Figure 1:
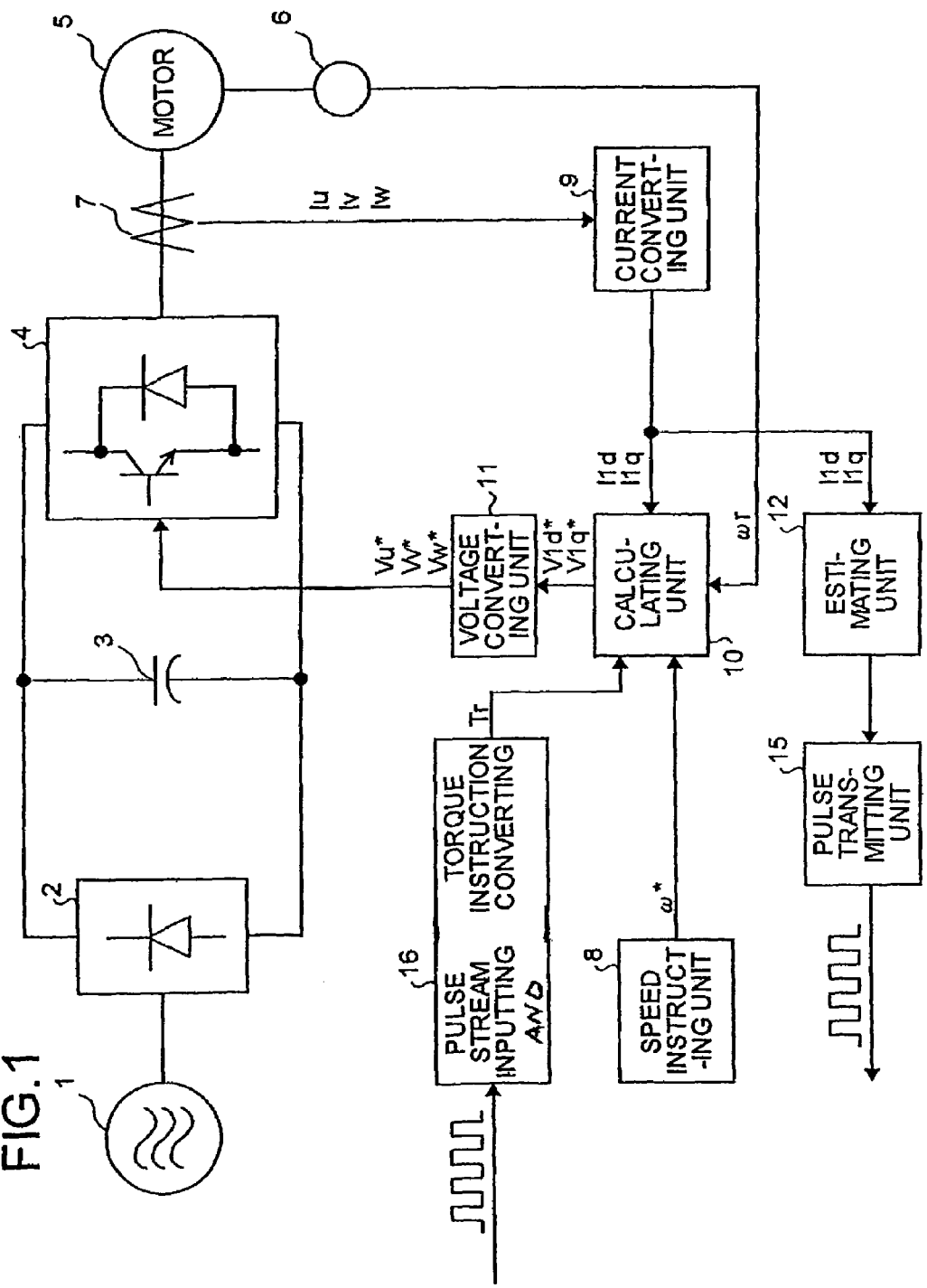
FIG. 1 is a block diagram of a vector control inverter according to an embodiment of the present invention.
Figure 5:
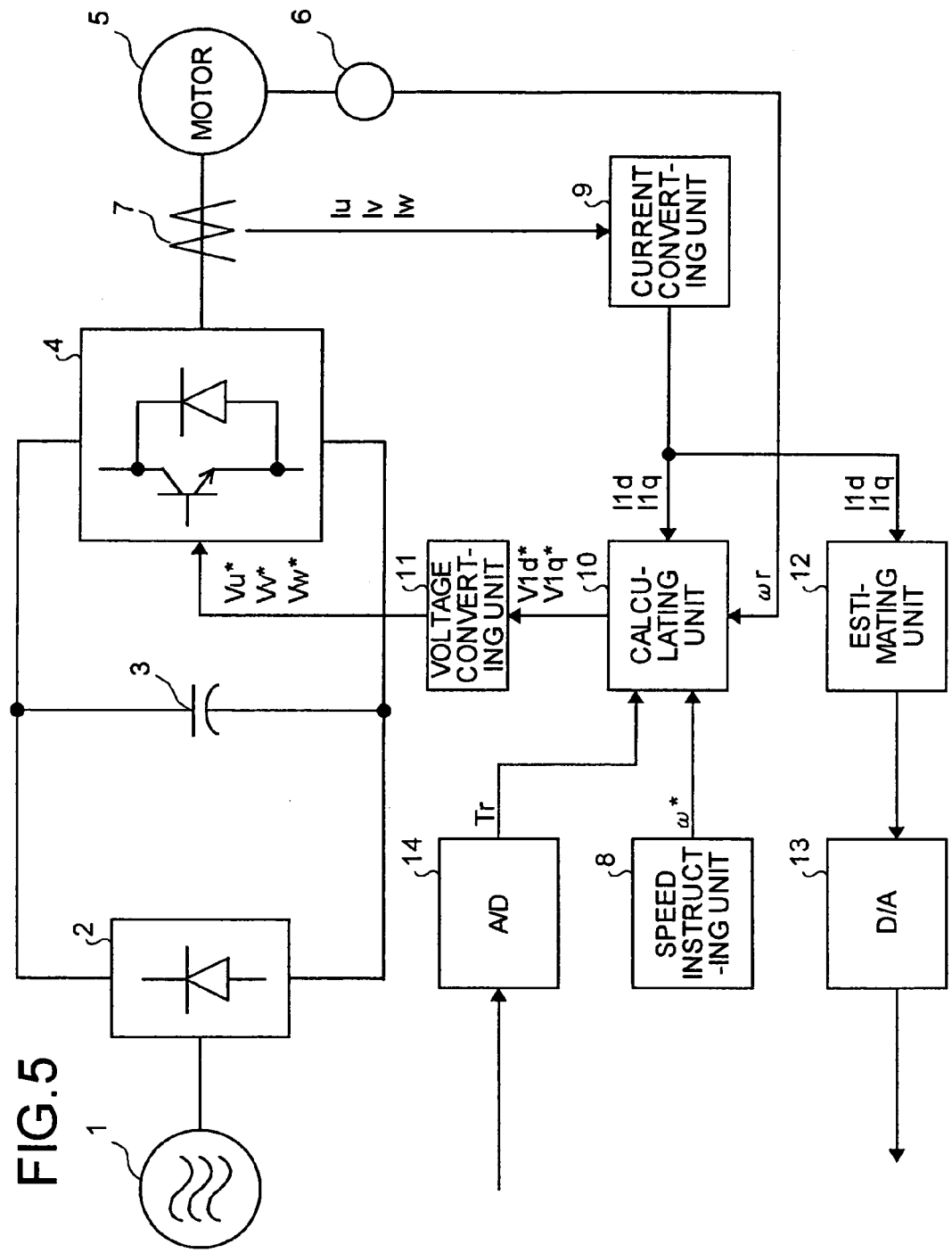
FIG. 5 is a block diagram of a conventional vector control apparatus.

FIG. 1 is a block diagram of a vector control inverter according to an embodiment of the present invention. The reference numerals 1 through 12 in FIG. 1 represent identical parts to the reference numerals 1 through 12 in FIG. 5. The vector control inverter includes a three-phase alternating current source 1, a rectifying circuit 2 including diode, etc. for obtaining direct current voltage from the three-phase alternating current source 1, an electrolytic capacitor 3 that smoothens the direct current voltage, an inverter circuit 4 including switching elements such as transistor, etc., a motor 5 to which a load is connected, a speed detector 6 that detects the rotation speed of the motor 5, a current detector 7 that detects the three-phase primary current Iu, Iv, and Iw flowing in the motor 5, a speed instruction circuit 8 that assigns a speed instruction $\omega^*$ of the motor 5, a three-phase to two-phase current converter 9 that calculates a excitation current I1$d$ and a torque current I1$q$ from the three-phase current Iu, Iv, and Iw, a vector control calculating circuit 10 that calculates primary voltage instruction values V1$d^*$ and V1$q^*$ to be assigned to the motor by inputting the speed instruction value $\omega^*$ of the speed instruction circuit 8 and a detection value $\omega$ of the speed detector 6 as well as the two-phase calculation values I1$d$ and I1$q$ of the current detector 7, a two-phase to three-phase voltage converter 11 that calculates three-phase output voltage instruction values Vu*, Vv*, and Vw* from the two-phase primary current instruction values V1$d^*$ and V1$q^*$, and an output torque estimator 12 that calculates an output torque of the motor 5 from the calculation values I1$d$ and I1$q$ of the three-phase to two-phase current converter 9.

The vector control inverter further includes a pulse transmitting unit 15 that receives the output torque from the torque estimator 12 and outputs from a pulse transmitter the torque estimation value as a pulse array signal, and a pulse array instruction input unit 16 that converts to a torque instruction a count value of a pulse counter that receives the pulse array signal. In the circuit shown in FIG. 1, both the pulse transmitting unit 15 and the pulse array instruction input unit 16 are present. However, if the conditions are such that only a master is involved, the pulse transmitting unit 15 alone may suffice. If the conditions are such that only a slave is involved, the pulse array instruction input unit 16 alone may suffice.

Figure 2:
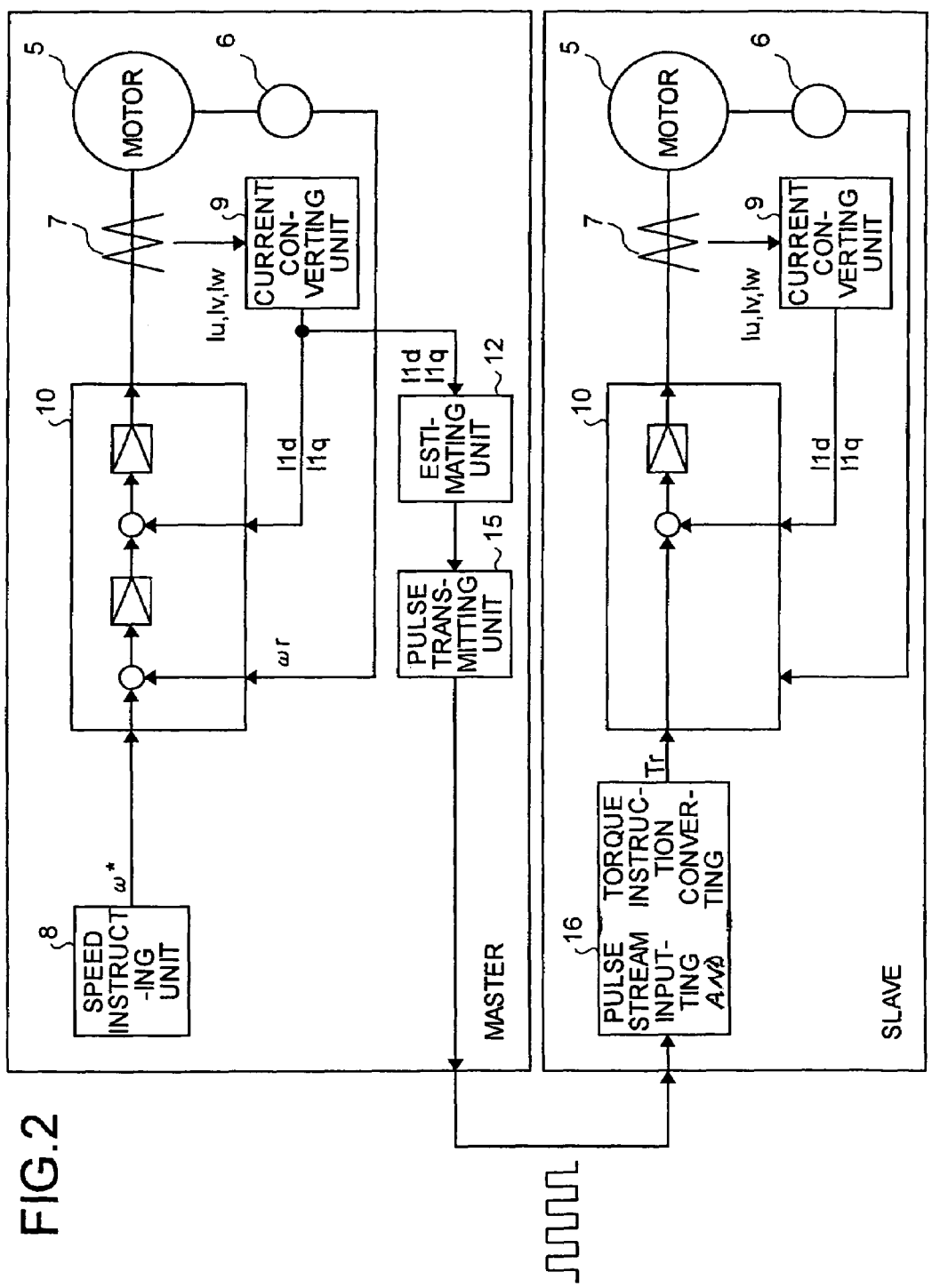
FIG. 2 is a block diagram of a system in which a synchronous operation is carried out using two of the vector control inverters.

FIG. 2 is a block diagram of a system in which a synchronous operation is carried out using two of the vector control inverters. The reference numerals 5 through 12, 15, and 16 in FIG. 2, represent the same parts as those in FIG. 1 and hence their explanation is omitted here. FIG. 2 illustrates an identical structure to that shown in FIG. 1 and hence is simplified.

As shown in FIG. 2, the pulse transmitting unit of the master vector control inverter is connected to the pulse array input unit 16 of the slave vector control inverter. The transfer of pulse array is carried out by the pulse transmitting unit 15 and the pulse array input unit 16.

Figure 3:
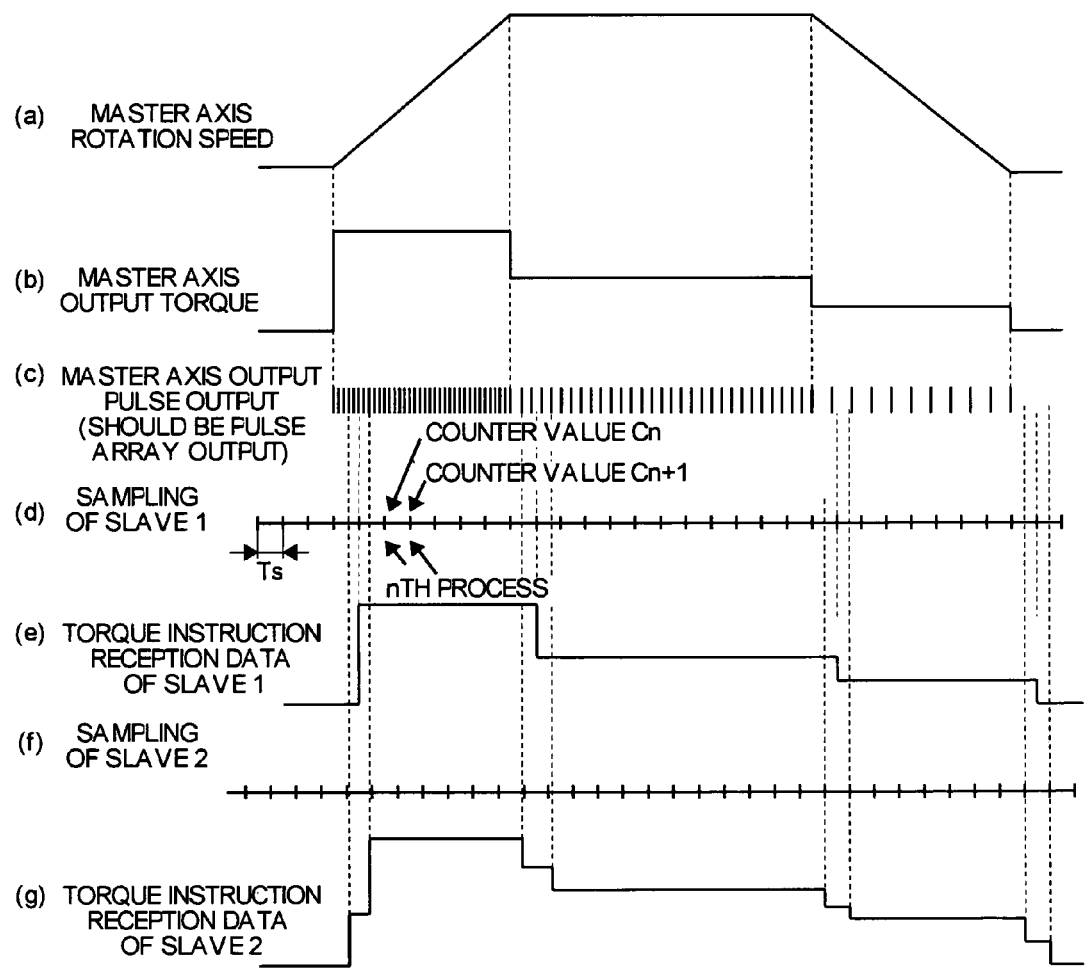
FIG. 3 is a torque instruction timing chart of a slave axis with respect to a rotation speed of a master axis in the vector control inverter.

FIG. 3A to FIG. 3G illustrate a flow of the torque instruction with respect to a rotation speed of the master axis in the embodiment according to the present invention. FIG. 3A illustrates a variation in the rotation speed of the master axis when a constant acceleration mode, a constant speed mode, and a constant deceleration mode are implemented. FIG. 3B illustrates the output torque by the output torque estimator 12 of the master axis. FIG. 3C illustrates the pulse array output by the pulse transmitting unit 15 of the master axis in response to the output torque. FIG. 3D illustrates a sampling time of the sampling based on a CPU of the slave axis 1. FIG. 3E illustrates a torque instruction value received by the slave axis 1. FIG. 3F illustrates a sampling time of the sampling based on the CPU of the slave axis 2. FIG. 3G illustrates a torque instruction value received by the slave axis 2.

As shown in FIG. 3C, the pulse of the pulse array output of the master axis is dense when the output torque is high and sparse when the output torque is low. The torque instruction value is determined in the slave axis based on the density of the pulse array output.

Figure 4:
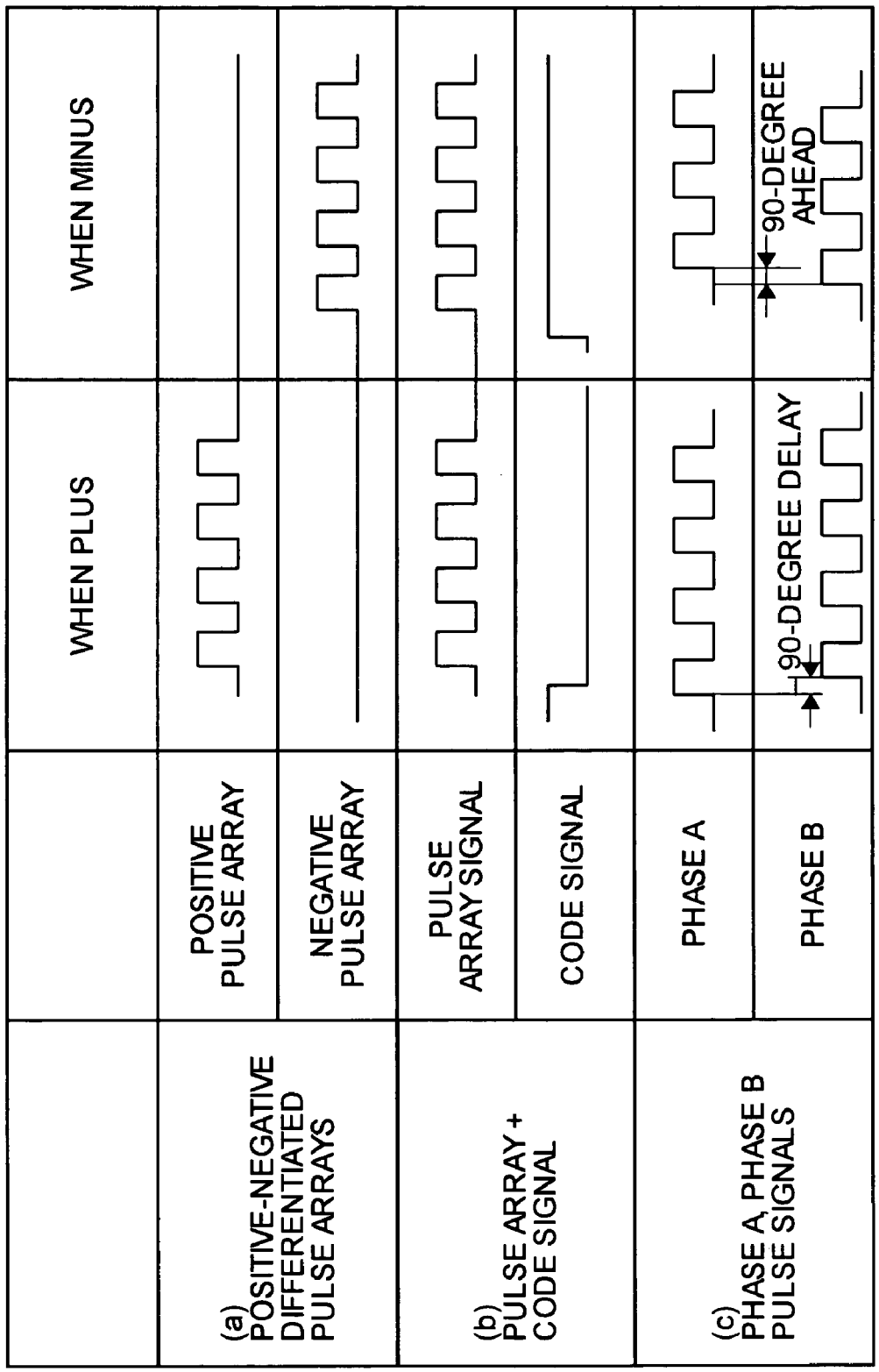
FIG. 4 illustrates three types of pulse stream signals used in the synchronous operation of the vector control inverter.

FIG. 4A to FIG. 4C illustrate three types of pulse stream signals used in the synchronous operation in normal rotation and reverse rotation. In other words, in the positive-negative differentiated pulse arrays shown in FIG. 4A, the direction of rotation is indicated by the presence of pulses. In the pulse array+code signal type of pulse stream signal shown in FIG. 4B, the direction of rotation is indicated by the code signal. In the phase A, phase B pulse signals shown in FIG. 4C, the direction of rotation is indicated by the phase difference.

Explained next with reference to FIG. 1 to FIG. 4 is the synchronous operation in the case where plural vector control inverters according to the present embodiment are used.

In the master vector control inverter, the pulse array transmitter 15 determines, based on the torque estimation value by the output torque estimator 12, the frequency of the output pulse array using expression (2) given below and outputs the pulse array to the slave side (in expression (2) it is assumed that the frequency of pulse array output is 1 kHz when a set standard torque is output by the inverter).

Pulse array frequency=(1 kHz . output torque estimation value)/standard torque value (2)

The pulse counter of the pulse array instruction input unit 16 of the slave vector control inverter receives the pulse stream signal output from the master vector control inverter and reads the counter value at intervals of a predetermined sampling period Ts.

If the counter value of the nth process is taken as Cn, and the counter value of the (n+1)th process is taken as Cn+1, the pulse frequency of the (n+1)th process is determined by expression (3) given below.

Frequency of (n+1)th process=(Cn+1−Cn)/Ts (3)

By reverse calculation, the pulse frequency determined in expression (3) is substituted in expression (2) in order to obtain the torque instruction.

Thus, the torque estimation value estimated by the master vector control inverter is converted to the torque instruction of the slave vector control inverter without requiring an analog conversion.

Even if there are plural slave axes, expression (3) can be applied to individual axis. By setting each slave axis such that the pulse array counter is always refreshed at a predetermined sampling period, it can be ensured that the slave axes move at the same torque at any timing once the master axis starts moving. Further, a slave axis can be easily removed or added during synchronous operation.

In the vector control inverter according to the present embodiment, even if there is no synchronization signal between the master axis and each of the plural slave axes, as the pulse value received from the predetermined sampling time of each slave axis (FIG. 3D for slave axis 1 and FIG. 3F for slave axis 2) is counted and substituted in expression (3), synchronous operation will occur without any hitch if a maximum of two-cycle delay between the master axis and the slave axis (FIG. 3E for slave axis 1 and FIG. 3G for slave axis 2) is set and the sampling period is kept sufficiently low so that the output axis is unable to respond.

Hence, fast synchronous operation can be achieved with a simpler structure than the serial communication system and without the fluctuation in the voltage levels or noise that occur in an analog signal.

The resolution and response are related to the length of the sampling period of the slave axis. The resolution improves if the sampling period is long and the response improves if the sampling period is short. Thus a sampling period can be set that is in accordance with the motor load and such properties.

According to the present invention, the vector control inverter includes a rotation speed detecting unit that detects a rotation speed of a motor from a rotation speed detector installed in the motor, a current detector that detects a primary current of the motor driven by an inverter circuit, a vector controller that splits the primary current detected by the current detector into an excitation current and a torque current and calculates an excitation voltage and a torque voltage for independently controlling, based on the detected rotation speed of the motor the excitation current and the torque current, respectively, and a PWM circuit that outputs an actual voltage from the excitation voltage and the torque voltage which are three-phase output voltages. The vector control inverter comprises at least one of a set of a torque estimating unit that estimates an output torque of the motor from the excitation current and the torque current and a pulse transmitting unit that outputs as positive-negative differentiated pulse stream signals a torque estimation value estimated by the torque estimating unit, and a set of a pulse array input unit that receives pulse stream signals input from outside as positive and negative values and a torque instruction converting unit that converts the received pulse stream signals into a torque instruction to be transferred to the motor as a torque. Thus, a structure is provided that allows transfer of synchronization signals (digital signals) without the necessity for a conversion process from digital signals to analog signals and vice versa and the disadvantages that accompany when analog signals are employed.

Further, according to the present invention, when synchronous operation between a driving master side and a driven slave side is carried out, the pulse stream signals input into the pulse stream signal input unit of the slave side are converted into the torque instruction value by the torque instruction converting unit alongside the output of torque estimation value as the torque instruction value by the pulse transmitting unit of the master side. Due to this, a slave can be added or removed without the requirement of a conventional communication software or hardware.

In this case, the slave side can comprise two or more separate apparatuses.

According to the present invention, the conversion to the torque instruction value by the torque instruction converting unit on the slave side is based on a sampling pulse produced separately. Thus, synchronization can be easily obtained.

In this case, the conversion to the torque instruction value by the torque instruction converting unit on the slave side is based on a sampling pulse produced separately. Thus, the independence of the slave(s) can be preserved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

According to the present invention, the period of the sampling pulse can be varied. Thus, the period can be selected to suit either resolution or response, according to requirement.

INDUSTRIAL APPLICABILITY

In the vector control inverter according to the present invention is suitable for controlling a motor from the master and the slave(s). Furthermore, the independence of the slave(s) can be preserved and a synchronous control of plural motors is possible.

What is claimed is:

1. A vector control inverter comprising:
   a speed detecting unit that detects a rotation speed of a motor;
   a current detecting unit that detects a primary current applied to the motor from an inverter circuit;
   a current converting unit that splits the primary current into an excitation current and a torque current;
   a calculating unit that calculates an excitation voltage and a torque voltage based on the rotation speed;
   a voltage converting unit that outputs a three-phase output voltage from the excitation voltage and the torque voltage;
   a modulating unit that outputs, based on the three-phase output voltage, a signal to control switching devices of the inverter circuit;
   an estimating unit that estimates an output torque of the motor from the excitation current and the torque current; and
   a pulse transmitting unit that outputs the output torque as a positive-negative identifiable pulse stream signal.

2. A vector control inverter comprising:
   a speed detecting unit that detects a rotation speed of a motor;
   a current detecting unit that detects a primary current applied to the motor from an inverter circuit;
   a current converting unit that splits the primary current into an excitation current and a torque current;
   a calculating unit that calculates an excitation voltage and a torque voltage based on the rotation speed;
   a voltage converting unit that outputs a three-phase output voltage from the excitation voltage and the torque voltage;
   a modulating unit that outputs, based on the three-phase output voltage, a signal to control switching devices of the inverter circuit;
   a pulse stream inputting unit that receives a pulse stream signal from outside; and
   a torque instruction converting unit that converts the pulse stream signal into a torque instruction.

3. The vector control inverter according to claim 2, wherein the torque instruction converting unit converts the pulse stream signal into the torque instruction based on a sampling pulse produced separately.

4. The vector control inverter according to claim 3, wherein a period of the sampling pulse is variable.

5. A vector control inverter comprising:
   a speed detecting unit that detects a rotation speed of a motor;
   a current detecting unit that detects a primary current applied to the motor from an inverter circuit;
   a current converting unit that splits the primary current into an excitation current and a torque current;
   a calculating unit that calculates an excitation voltage and a torque voltage based on the rotation speed;
   a voltage converting unit that outputs a three-phase output voltage from the excitation voltage and the torque voltage;
   a modulating unit that outputs, based on the three-phase output voltage, a signal to control switching devices of the inverter circuit;
   an estimating unit that estimates an output torque of the motor from the excitation current and the torque current;
   a pulse transmitting unit that outputs the output torque as a positive-negative identifiable pulse stream signal;
   a pulse stream inputting unit that receives a pulse stream signal from outside; and
   a torque instruction converting unit that converts the pulse stream signal into a torque instruction.

6. The vector control inverter according to claim 5, wherein when performing a synchronous operation of at least two of the vector control inverters by setting one vector control inverter as a master side being a reference, and setting other vector control inverter as a slave side following the master side,
   the pulse transmitting unit outputs the output torque as the torque instruction at the master side, and
   the torque instruction converting unit converts the pulse stream signal into the torque instruction at the slave side.

7. The vector control inverter according to claim 6, wherein the slave side comprises two or more separate vector control inverters.

8. The vector control inverter according to claim 5, wherein the torque instruction converting unit converts the pulse stream signal into the torque instruction based on a sampling pulse produced separately.

9. The vector control inverter according to claim 8, wherein a period of the sampling pulse is variable.

* * * * *